United States Patent [19]

Gambetta

[11] Patent Number: 4,623,122
[45] Date of Patent: Nov. 18, 1986

[54] VALVE WITH IMPROVED SEAL

[75] Inventor: David L. Gambetta, Tupelo, Mich.

[73] Assignee: ITT Corporation, New York, N.Y.

[21] Appl. No.: 746,616

[22] Filed: Jun. 19, 1985

[51] Int. Cl.⁴ .......................... F16K 3/30; F16K 3/02
[52] U.S. Cl. .................................... 251/328; 251/326
[58] Field of Search ............... 251/326, 327, 328, 329, 251/333, 334; 277/179, 184, 205

[56] References Cited

U.S. PATENT DOCUMENTS

| | | | |
|---|---|---|---|
| 2,606,740 | 8/1952 | Allen | 251/167 |
| 2,853,269 | 8/1958 | Shand | 251/327 |
| 2,978,221 | 4/1961 | Pool | 251/172 |
| 2,985,422 | 5/1961 | Anderson | 251/172 |
| 3,121,553 | 2/1964 | Grove | 251/172 |
| 3,185,436 | 5/1965 | Rovang | 251/172 |
| 3,222,028 | 12/1965 | Grove | 251/327 |
| 3,333,816 | 8/1967 | Williams et al. | 251/327 |
| 3,356,334 | 12/1967 | Scaramucci | 251/328 X |
| 3,380,708 | 4/1968 | Scaramucci | 251/328 X |
| 3,380,709 | 4/1968 | Scaramucci | 251/328 X |
| 3,398,926 | 8/1968 | Scaramucci | 251/328 X |
| 3,561,727 | 2/1971 | Scaramucci | 251/172 |
| 4,051,863 | 10/1977 | Still | 137/454.2 |
| 4,163,544 | 8/1979 | Fowler | 251/328 |
| 4,206,905 | 6/1980 | Dobler | 251/328 |
| 4,429,710 | 2/1984 | Grieves | 137/375 |

FOREIGN PATENT DOCUMENTS 572460 4/1959 Belgium ............................ 251/328

Primary Examiner—Martin P. Schwadron
Assistant Examiner—John S. Starsiak, Jr.
Attorney, Agent, or Firm—John T. O'Halloran; Mary C. Werner

[57] ABSTRACT

A valve assembly including an annular ring having an inwardly directed projection and a seal having a groove into which the projection is fitted. The seal has a sealing surface which engages a valve member. The seal has two ribs which project from the sealing surface and a protrusion extending into the groove, the ribs and the protrusion engaging respectively the valve member and the annular ring for providing a bubble-tight seal.

14 Claims, 5 Drawing Figures

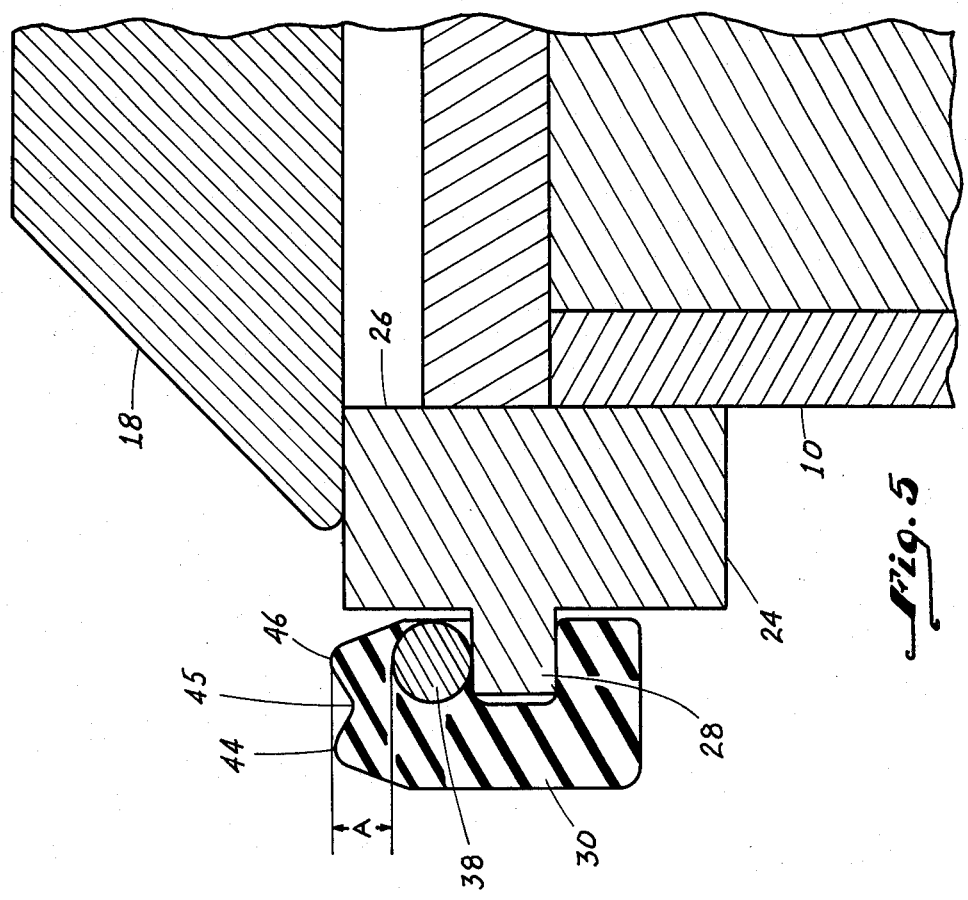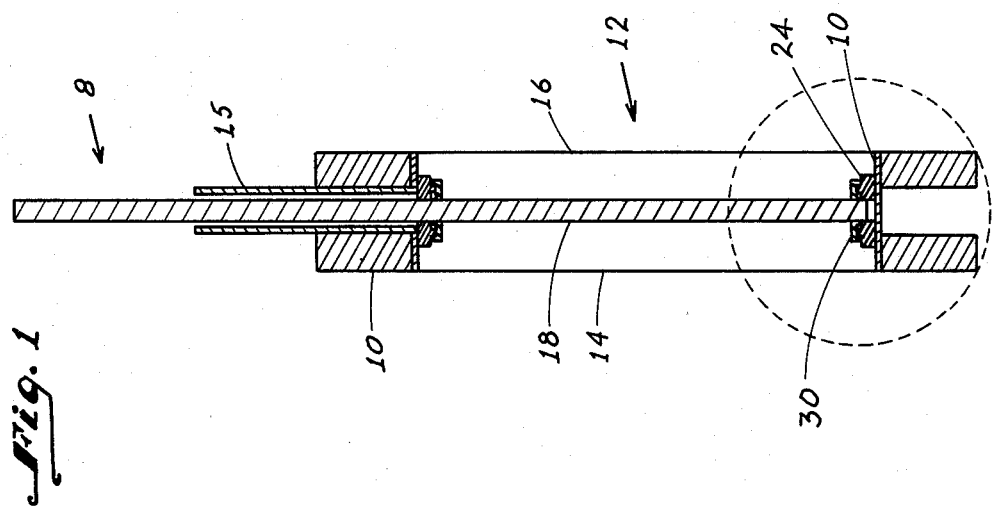

VALVE WITH IMPROVED SEAL

BACKGROUND OF THE INVENTION

This invention relates generally to valves and more particularly to gate and other similar type valves having an improved seal member associated with a valving member.

With valves of the type noted above, the valve member seal arrangement includes a groove in a valve body or in a supporting ring structure in which the seal member is often retained by an adhesive. The seal member includes a sealing surface which engages the valve member to form a bubble tight seal. In the construction using an adhesive, the seal member which may be a rubber ring, protrudes from a valve seat surface so that when the valve is closed, there is an interference between the valving member and the rubber ring thereby effecting the bubble-tight seal.

However, there are many problems associated with the adhesively retained seal arrangements. Since the temperature and media limits are not as good as the elastomer used in the seal, premature seal failure results. Also, the flexing of the seal caused by the frictional drag of the valve member upon the seal breaks down the mechanical retention properties of the adhesive until the bond fails. At this point, the seal moves into the pathway of the valve member and is ruined. Improper installation due to the application of too much adhesive or irregularly applied adhesive can cause the seal to fail. In addition, the different set up and cure times of adhesives can cause difficulties. Another problem associated with adhesively retained seals is that of replacing the seals in the field which entails a time consuming and often difficult process of removing the old adhesive from the groove. With respect to valves of the knife gate type, when the adhesive fails, the seal tends to bunch up and be sliced by the knife edge of the gate.

In addition, seals which are retained by means of an adhesive physically confine the seal material along its inner diameter restricting flowability of the seal material. While prior seals have included ribbed portions on the sealing face, the ribbed structure has not permitted sufficient room for the material of the seal to flow when the seal is fully compressed. This restricting of the flowability of the material of the seal causes the seal to be pinched between the knife gate and the valve seat and damaged.

OBJECTS OF THE INVENTION

It is therefore an object of the present invention to provide a valve and an associated seal and a mounting structure therefor which overcome the disadvantages of the prior art.

It is an additional advantage of the present invention to provide a seal which is easily installed and removed from a valve seat.

It is a further object of the invention to provide a seal which will not be pinched and damaged during operation of the valve member.

It is yet another object to provide a knife gate valve and seal arrangement which provides a bubble-tight seal.

SUMMARY OF THE INVENTION

These objects and others which will become apparent hereinafter are accomplished by the present invention which provides an annular seal which is retained on a valve body. The valve body has a passageway formed by inlet and outlet portions and a valve member which is mounted for movement in the passageway between an open and a closed position. The annular seal cooperates with the valve member and has a groove which permits seating of the seal on a projection which extends into the passageway from the valve body. The seal has a reinforcing ring of a rigid material which is embedded therein and which extends along the periphery of a portion of the groove which is closest to the sealing face and which is adjacent the upstream side of the projection.

Preferably, two ribs extend from the seal face and one seal bead extends from the groove of the seal ring permitting retention of the seal on the ring and providing a fluid tight structure when the seal is in engagement with the knife gate.

BRIEF DESCRIPTION OF THE DRAWING

Above-mentioned and other features and objects of this invention will become more apparent by reference to the following description taken in conjunction with the accompanying drawings in which:

FIG. 1 is a cross-sectional view of a seal and valve arrangement according to the present invention;

FIG. 5 is a cross-sectional view of the seal of the invention in a seated position.

DETAILED DESCRIPTION OF THE PREFERRED EMBODIMENT

Figure 3:
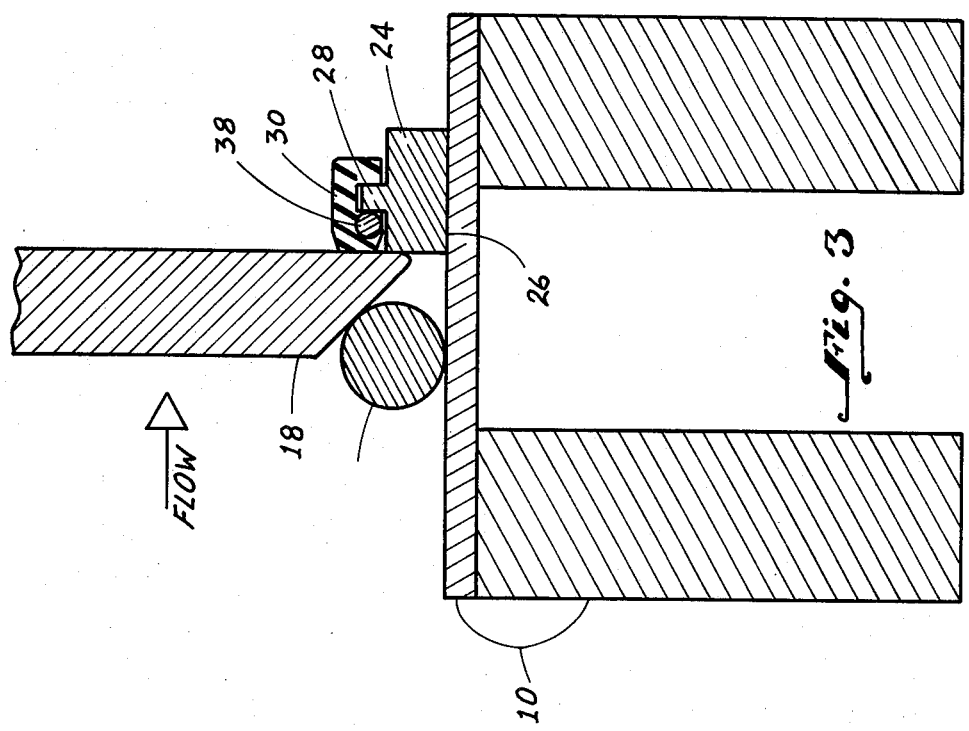
FIG. 3 is a cross-sectional view of a second embodiment of the invention showing the ring and one seal in a knife gate valve.
Figure 2:
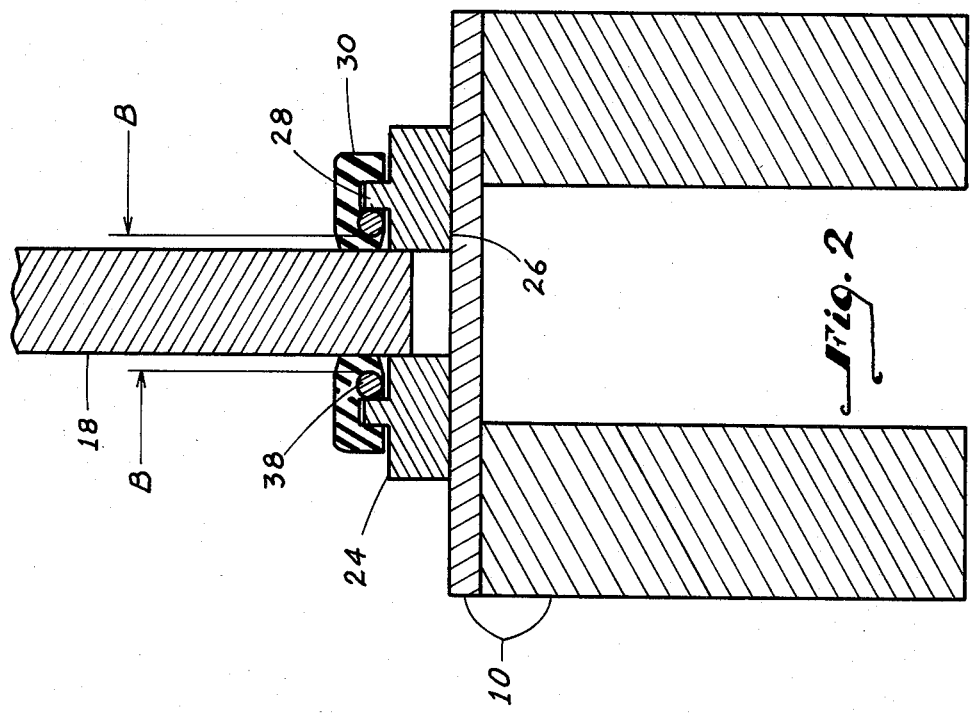
FIG. 2 is an enlarged cross-sectional view of the circled portion of FIG. 1 showing one embodiment of the invention with the ring and two seals in a knife gate valve.

In FIG. 1, there is shown a knife gate valve 8 including a valve body 10 having a fluid passageway 12 which includes an inlet section 14 and an outlet section 16. A gate 18 is reciprocally and slidably mounted in the valve body 10 between the inlet section 14 and the outlet section 16. The gate 18 slides from an open position (not shown), where the gate 18 does not obstruct the flow of fluid through the passageway 12, to a closed position where the gate 18 prevents the flow of fluid through the passageway 12. An actuator assembly (not shown) is associated with the gate 18 to move it between its open and closed positions and may take the form of a conventional hand operated screw assembly. In this arrangement, the valve body 10 is a fabricated housing with inlet section 14 and outlet section 16 and a chest area 15 in which the gate 18 is slidably mounted. Other embodiments include a cast valve body 10 with the chest 15, inlet section 14 and outlet section 16 and seat 24 integral to the casting. In valves of this type, at least one seal assembly cooperates with a planar surface of a gate to prevent fluid flow through a passageway. Some embodiments, as illustrated in FIGS. 1 and 2 include two seal assemblies, one for the upstream planar surface and another for the downstream planar surface. Other embodiments include only one seal assembly usually located on the upstream side as illustrated in FIG. 3. Only one seal assembly will be described since the other is the same.

The seal assembly includes an annular ring 24 which has a "T" shaped cross-section. As is clearly illustrated in FIGS. 2 and 3, the flat top portion 26 of the "T" is secured to the valve body 10, and a leg 28 of the "T" projects inwardly into the passageway 12 adjacent the gate 18. While the ring 24 has been described and illustrated as having a "T"-shaped cross-section, any other configuration in which a projection extends from the valve seat inwardly into the passageway 12 will be satisfactory. Such other configuration may include an L-shaped projection or a leg integrally formed on the valve body 10.

Figure 4:
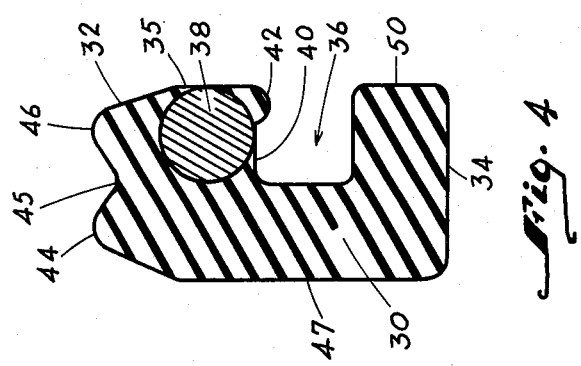
FIG. 4 is a cross-sectional view of the seal in accordance with this invention.

Reference is now made to FIG. 4. An annular seat ring or seal 30 is made of a resilient material which is impervious to the fluid flowing in the passageway 12. Such resilient material may be rubber, neoprene or the like. The seal 30 has a sealing face 32 located adjacent the gate 18. The sealing face 32 and the gate 18 are adapted to cooperate with each other to form a bubble-tight seal. The seal 30 also includes an oppositely disposed planar face 34. A radially outer peripheral surface 35 of the seal ring 30 is formed with a U-shaped groove 36. The size of the groove 36 is such that it fits onto the leg 28 of the annular ring 24 and in close engagement therewith. The seal 30 is located on the leg 28 with the groove 36 tightly seated thereon. A bottom section 50 adjacent the planar face 34 may extend the same distance as surface 35. In larger seals, the bottom section 50 may be recessed, in order to permit easier installation of the seal 30.

A rigid ring insert 38 is embedded in the seal 30. The rigid ring insert 38 has a substantially round cross-section and is made of stainless steel, fiber glass, plastic or other rigid material. The rigid ring insert 38 is not restricted to a round cross-section but may also be square or any other suitable shape. The rigid ring insert 38 is located in the annular ring 24 so that it is adjacent the side surface 40 of the groove 36 closest to the sealing face 32. When the seal member 30 is located on the leg 28, the rigid ring insert 38 bears against the upstream side of the projecting leg 28. In this way, the forces of the fluid which bear against the gate 18 when in its closed position will not cause the seal 30 to become displaced from the annular ring 24 and thereby result in fluid leakage.

A seal bead 42 extends from the side surface 40 of the groove 36 at its junction with the peripheral surface 35. When the seal 30 is positioned on the ring 24, the seal bead 42 engages the upstream side of the projecting leg 28 with an interference fit, thus affecting zero leakage around the backside of the seal 30. A grommet-like lip 50 wraps around the downstream side of projecting leg 28 locking the seal 30 in place. Thus, the seal 30 is securely retained on the ring 24. The insert 38 is preferably molded into the seal 30 so that it is surrounded over a major portion of its surface by the resilient material forming the seal. The bead 42 is thus conveniently formed during the molding operation.

The sealing face 32 is corrugated. In this embodiment it has two projecting ribs or beads 44, 46 separated by a trough 45. The rib 44 is formed on the radially inward surface 47 of the seal so that it is closest to the flow passageway. The rib 46 is positioned radially outwardly of rib 44 and extends adjacent the surface 35 and the valve body 10. The rib 46 protrudes a greater outward distance from the trough 45 than the rib 44. This configuration provides better sealing capability at low differential pressures. In a typical size valve, the rib 46 extends from the trough 45 a distance of 0.005 inches further than the rib 44. It has been found that this distance provides optimum sealing conditions. When the valve is closed, the ribs 44 and 46 engage a planar surface of the gate 18. The positioning of the gate 18 against the ribs 44 and 46 causes compression of the seal 30. During compression, the ribs 44 and 46 are deformed and the seal 30 is compressed approximately 22 percent. It has been found that compression of the seal 30 to a maximum of 22 percent provides an effective sealing arrangement when the gate 18 is in its closed position and must withstand the forces of the fluid which bear against the surface of the gate 18. Greater amounts of compression overstress the seal 30 and cause the the tear resistance of the seal to decrease resulting in premature deterioration thereof. The following equation will give the compression percentage:

$$\frac{A - B}{A} \times 100 = \% \text{ Compression}$$

The dimensions represented by A and B are measured as indicated in FIGS. 5 and 2, respectively. The width A represents the uncompressed condition of the seal 30 when the gate 18 is not in engagement therewith. The width B represents the compressed condition with the sealing face 32 engaging the gate 18. In the compressed condition the seal material flows so as to fill the trough 45 and present a substantially planar surface in contact with the gate 18.

The rigid ring insert 38 prevents the seal 30 from being dislodged from the leg 28 by the frictional drag caused by the movement of the gate 18 against the seal 30. Thus, displacement of the seal 30 out of the annular ring 24 and into the passage way 12 is eliminated. This also prevents slicing of the seal 30 by the gate 18 due to the frictional drag on the seal 30 as it proceeds between its closed and open positions causing radial movement of the seal 30.

Due to the configuration of the sealing face 32 and the protruding ribs 44 and 46 and the fact that the inside diameter of the seal 30 is not confined because of the resiliency of the material thereof, the compression of the seal 30 when the gate 18 is in engagement therewith permits the material of the seal 30 to flow. This further minimizes the chance of pinching of the seal 30.

The ribs 44 and 46 together with the seal bead 42 provide a bubble-tight seal between the gate 18 and the seal 30 both at the sealing face 32 and at the back portion of the seal 30 adjacent the annular ring 24.

FIG. 5 illustrates generally the seal 30 positioned on the annular ring 24.

FIG. 2 illustrates one embodiment of the invention in a bi-directional gate valve in which a valve seal surrounds both the inlet section 14 and the outlet section 16 of the passageway 12 and one seal 30 is positioned on each of the valve seats.

FIG. 3 illustrates a second embodiment of the invention in which one seal 30 and one "T" shaped annular ring 24 are used in a gate valve which performs a unidirectional shut off function. In this figure, the gate 18 in its closed position is situated between the seal 30 and a body wedge 48 on the valve body 10. The arrow indicates the direction of flow of the fluid material.

While the seal of the invention has been described with particular reference to an annular ring and a knife gate valve, it is to be noted that the seal may be used in other types of valves such as swing check valves and with other valve seat arrangements.

While I have described the principles of my invention in connection with specific apparatus, it is to be clearly understood that this description is made only by way of example and not as a limitation to the scope of my invention as set forth in the objects thereof and in the accompanying claims.

What is claimed is:

1. A valve comprising:
   a valve body having an inlet portion and an outlet portion forming a passageway, said valve body further having a first leg projecting radially into said passageway;
   a valve member located in said valve body adjacent one side of said leg and mounted for movement between an open position in which fluid flows in said passageway and a closed position in which fluid is prevented from flowing through said passageway;
   a first resilient annular seal having concentric inner and outer peripheral surfaces and an adjacent sealing face, said outer peripheral surface being formed with a radially inwardly extending groove having a pair of parallel, spaced-apart sidewalls, said first leg extending into said groove such that said sidewalls each bear against a leg surface, a reinforcing ring of a rigid material embedded in said first seal between said first leg and said sealing face and extending along the adjacent sidewall of said groove which is closer to said sealing face so as to bear against the adjacent leg surface and resist the forces of a fluid acting on the valve member when said valve member is in its closed position.

2. The valve as claimed in claim 1 wherein said leg is formed on an annular ring having a T-shaped cross section.

3. The valve as claimed in claim 2 wherein said sealing face is corrugated and is compressed during movement of said valve member and in the closed position to prevent fluid flow around said seal.

4. The valve as claimed in claim 3 wherein said corrugated sealing face includes a plurality of ribs.

5. The valve as claimed in claim 3 wherein the maximum amount of the compression is approximately 22%.

6. The valve as claimed in claim 3 wherein one of said ribs extends adjacent said outer periperal surface of said seal and projects a greater radially outward distance than the remaining ribs to prevent leakage of fluid at low differential pressures around said valve member when in its closed position and to reduce pinching of said seal during movement of said valve member.

7. The valve as claimed in claim 1 wherein said adjacent side wall has a protrusion extending into said groove, said protrusion engaging said first leg with an interference fit to prevent fluid flow around said groove.

8. The valve as claimed in claim 1 wherein the rigid material includes any one of a stainless steel, fiber glass or plastic material.

9. The valve according to claim 1 further comprising:
   a second leg projecting radially inwardly into said passageway adacent the opposite side of said valve member;
   a second resilient annular seal cooperating with said valve member and having concentric inner and outer peripheral surfaces and an adjacent sealing face, said outer peripheral surface being formed with a radially inwardly extending groove having a pair of parallel, sapced-apart sidewalls, said first leg extending into said groove such that said sidewalls each bear against a second leg surface, a reinforcing ring of a rigid material embedded in said second seal between said second leg and said sealing face and extending along the adjacent side wall of said groove which is closer to said sealing face so as to bear against the adjacent leg surface and resist the forces of a fluid acting on the valve member when said valve member is in its closed position.

10. A valve comprising:
    a valve body having a passageway therethrough for the flow of fluid material;
    valve means located in said valve body and mounted for movement in said passageway between an open and a closed position; and
    a resilient annular seal located in said valve body and having concentric inner and outer peripheral surfaces, an adjacent sealing surface engaging said valve means and at least two annular ribs formed on said sealing surface which permit maximum compression of approximately 22% of said seal during movement of said valve means into the closed position to prevent fluid flow around said seal, said seal including a groove extending along the outer surface having a pair of parallel, spaced-apart sidewalls, a portion of said valve body extending into said groove such that said sidewalls bear against said portion, and a reinforcing ring of a rigid material embedded in said seal between the valve body portion and said sealing surface and extending along the sidewall of said groove which is closer to said sealing surface so as to bear against the valve body portion and resist the forces of a fluid acting on the valve member when said valve member is in a closed position.

11. The valve as claimed in claim 10 wherein said valve means is a knife gate.

12. The valve as claimed in claim 11 wherein said sidewall adjacent said sealing surface has a protrusion extending into said groove and engaging said valve body portion with an inteference fit to prevent leakage of fluid into said groove.

13. The valve as claimed in claim 10 wherein one of said ribs extends adjacent the outer surface of said annular seal and projects a greater radially outward distance than the other of said corrugations.

14. The valve as claimed in claim 10 wherein the rigid material includes any one of a stainless steel, fiber glass and plastic material.

* * * * *